United States Patent
Dinkelman

(10) Patent No.: US 10,195,688 B2
(45) Date of Patent: Feb. 5, 2019

(54) LASER WELDING SYSTEM FOR A BATTERY MODULE

(71) Applicant: Johnson Controls Technology Company, Holland, MI (US)

(72) Inventor: John P. Dinkelman, South Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 377 days.

(21) Appl. No.: 14/631,664

(22) Filed: Feb. 25, 2015

(65) Prior Publication Data

US 2016/0193694 A1    Jul. 7, 2016

Related U.S. Application Data

(60) Provisional application No. 62/099,947, filed on Jan. 5, 2015.

(51) Int. Cl.
*B23K 26/062* (2014.01)
*B23K 26/082* (2014.01)
(Continued)

(52) U.S. Cl.
CPC ........ *B23K 26/0626* (2013.01); *B23K 26/082* (2015.10); *B23K 26/0876* (2013.01);
(Continued)

(58) Field of Classification Search
CPC .............. B23K 26/0626; B23K 26/082; B23K 26/0876; B23K 26/21; B23K 26/244; B23K 26/32; B23K 2203/12
See application file for complete search history.

(56) References Cited

U.S. PATENT DOCUMENTS 4,555,610 A  * 11/1985  Polad ............... B23K 26/10
                                                 219/121.61
4,973,819 A  * 11/1990  Thatcher ............ B23K 26/10
                                                 219/121.63
(Continued)

FOREIGN PATENT DOCUMENTS

CN       203197472       9/2013
CN       204037494      12/2014
(Continued)

OTHER PUBLICATIONS

Machine translation of Japan Patent document No. 2003-164,986, Jan. 2018.*

(Continued)

*Primary Examiner* — Geoffrey S Evans
(74) *Attorney, Agent, or Firm* — Fletcher Yoder, P.C.

(57) ABSTRACT

The present disclosure relates generally to a welding process for a battery module. In an embodiment, a system for welding two components in a battery module includes a laser source configured to emit a laser beam onto a workpiece having a first battery module component and a second battery module component. The system also has an actuator coupled to the laser source and configured to move the laser beam along a first axis and a second axis and a controller electrically coupled to the laser source and the actuator. The controller is configured to send a signal to the laser source and the actuator to form a sinusoidal lap weld on a surface of the workpiece, such that the first battery module component is electrically coupled to the second battery module component.

16 Claims, 12 Drawing Sheets

(51) Int. Cl.
*B23K 26/06* (2014.01)
*H01M 2/30* (2006.01)
*H01M 10/0525* (2010.01)
*H01M 2/20* (2006.01)
*B23K 26/21* (2014.01)
*B23K 26/08* (2014.01)
*B23K 26/32* (2014.01)
*H01M 2/10* (2006.01)
*B23K 26/244* (2014.01)
*H01M 10/052* (2010.01)
*H01M 10/42* (2006.01)
*H01M 10/48* (2006.01)

(52) U.S. Cl.
CPC ............ *B23K 26/21* (2015.10); *B23K 26/244* (2015.10); *B23K 26/32* (2013.01); *H01M 2/1072* (2013.01); *H01M 2/1077* (2013.01); *H01M 2/20* (2013.01); *H01M 2/206* (2013.01); *H01M 2/305* (2013.01); *H01M 10/052* (2013.01); *H01M 10/0525* (2013.01); *H01M 10/425* (2013.01); *H01M 10/482* (2013.01); *H01M 2220/20* (2013.01); *Y02E 60/122* (2013.01)

(56) References Cited

U.S. PATENT DOCUMENTS

| | | | | |
|---|---|---|---|---|
| 5,302,802 A * | 4/1994 | Fujinaga | | B23K 26/0884 219/121.74 |
| 5,595,670 A * | 1/1997 | Mombo-Caristan | | B23K 15/006 219/121.14 |
| 5,624,585 A * | 4/1997 | Haruta | | B23K 26/073 219/121.63 |
| 5,665,255 A | 9/1997 | Busuttil | | |
| 5,841,097 A | 11/1998 | Esaka et al. | | |
| 5,958,267 A * | 9/1999 | Lingenfelter | | B23K 26/032 219/121.63 |
| 6,744,007 B2 | 6/2004 | Ono et al. | | |
| 7,154,065 B2 | 12/2006 | Martukanitz et al. | | |
| 7,288,736 B2 | 10/2007 | Schildgen | | |
| 7,906,744 B2 * | 3/2011 | Rippl | | B23K 26/0884 219/121.63 |
| 7,910,855 B2 | 3/2011 | Dinauer et al. | | |
| 8,168,919 B2 | 5/2012 | Hamaguchi et al. | | |
| 8,350,185 B2 | 1/2013 | Lee et al. | | |
| 8,574,008 B2 | 11/2013 | Große et al. | | |
| 8,766,136 B2 | 7/2014 | Kessler et al. | | |
| 8,808,885 B2 | 8/2014 | Lee et al. | | |
| 9,138,827 B2 | 9/2015 | Lee et al. | | |
| 2003/0136767 A1* | 7/2003 | Faitel | | B23K 26/02 219/121.63 |
| 2003/0183605 A1* | 10/2003 | Vivet | | B23K 26/02 219/121.63 |
| 2004/0232119 A1* | 11/2004 | Olowinsky | | B23K 26/08 219/121.64 |
| 2006/0054611 A1* | 3/2006 | Stol | | B23K 9/02 219/137 R |
| 2006/0144827 A1* | 7/2006 | Papenfuss | | B23K 26/22 219/121.64 |
| 2008/0245777 A1* | 10/2008 | Cremerius | | B23K 26/08 219/121.64 |
| 2009/0206066 A1* | 8/2009 | Rekowski | | B23K 26/082 219/121.81 |
| 2009/0230100 A1* | 9/2009 | Menin | | B23K 26/244 219/121.63 |
| 2010/0054408 A1* | 3/2010 | Echner | | A61N 5/1042 378/65 |
| 2010/0206856 A1* | 8/2010 | Tanaka | | B23K 26/244 219/121.64 |
| 2010/0305757 A1* | 12/2010 | Sonner | | B23K 26/02 700/262 |
| 2013/0168371 A1 | 7/2013 | Furusako et al. | | |
| 2014/0004390 A1* | 1/2014 | Nishida | | H01M 2/22 429/7 |
| 2015/0099152 A1* | 4/2015 | Bantel | | H01M 2/206 429/121 |
| 2015/0126078 A1 | 5/2015 | Kawamura et al. | | |
| 2015/0314392 A1 | 11/2015 | Haschke et al. | | |
| 2016/0016262 A1* | 1/2016 | Tsipis | | B23K 26/32 219/121.64 |
| 2016/0067824 A1 | 3/2016 | Dajnowski | | |
| 2016/0211500 A1* | 7/2016 | Lee | | H01M 2/26 |

FOREIGN PATENT DOCUMENTS

| | | | |
|---|---|---|---|
| CN | 103056533 | | 4/2015 |
| CN | 103495803 | | 9/2015 |
| DE | 102007021361 | | 11/2008 |
| DE | 102007063456 | | 11/2008 |
| DE | 102007063456 A1 * | 11/2008 |
| DE | 102013015710 | | 7/2014 |
| DE | 102014105941 | | 11/2014 |
| DE | 102014224738 | | 6/2016 |
| EP | 0823304 | | 2/1998 |
| EP | 3020502 | | 5/2016 |
| GB | 2328636 A * | 3/1999 |
| JP | 54-101596 A * | 8/1979 |
| JP | 61-242782 A * | 10/1986 |
| JP | 62-050095 A * | 3/1987 |
| JP | 04-162975 A * | 6/1992 |
| JP | 09-122964 A * | 5/1997 |
| JP | 1071480 | | 3/1998 |
| JP | 2000042776 | | 2/2000 |
| JP | 2003-164986 A * | 6/2003 |
| JP | 2008-213004 A * | 9/2008 |
| WO | 2013167240 | | 11/2013 |
| WO | 2014063153 | | 4/2014 |
| WO | 2015106833 | | 7/2015 |
| WO | 2016055184 | | 4/2016 |
| WO | 2016118555 | | 7/2016 |

OTHER PUBLICATIONS

Machine translation of Japan Patent document No. 9-122,964, Apr. 2018.*

Machine translation of Japan Patent document No. 2008-213,004-A., Jan. 2018.*

PCT/US2015/061562 International Search Report dated Mar. 24, 2016.

201580061276.3 Office Action dated Jul. 2, 2018.

* cited by examiner

LASER WELDING SYSTEM FOR A BATTERY MODULE

CROSS REFERENCE TO RELATED APPLICATIONS

This application claims priority from and the benefit of U.S. Provisional Application Ser. No. 62/099,947, entitled "WELDING PROCESS FOR A BATTERY MODULE," filed Jan. 5, 2015, which is hereby incorporated by reference.

BACKGROUND

The present disclosure relates generally to the field of batteries and battery modules. More specifically, the present disclosure relates to a welding process for a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Start-Stop" system similar to the mild hybrids, but the micro-hybrid systems may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery module. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, in traditional configurations, battery modules may include a number of interconnected electrochemical cells coupled together via bus bars (e.g., minor bus bars) extending between terminals (e.g., minor terminals or cell terminals) of the electrochemical cells. Further, the battery module may include two major terminals electrically coupled with the interconnected electrochemical cells via corresponding electrical paths, each electrical path having a major bus bar extending from the major terminal between the major terminal and the minor terminal of one of the electrochemical cells. This enables the two major terminals to be coupled to a load for powering the load via electric power provided by the interconnected electrochemical cells. In traditional configurations, each major bus bar and corresponding major terminal of the battery module may be welded together to establish at least a portion of the electrical path between the major terminal and the minor terminal, meaning that the major bus bar and the major terminal may be made of the same material, or at least compatible materials for welding. It is now recognized that some welding procedures may result in a high cost of the battery module. Further, it is now recognized that some welding techniques may transfer a significant amount of energy to the weld components, which may melt or damage electronics included within a housing, or the housing itself, of the battery module. Accordingly, it is now recognized that an improved welding process for battery modules is needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a system for welding two components in a battery module that includes a laser source configured to emit a laser beam onto a workpiece comprising a first battery module component and a second battery module component. The system also has an actuator coupled to the laser source and configured to move the laser beam along a first axis and a second axis and a controller electrically coupled to the laser source and the actuator. The controller is configured to send a signal to the laser source and the actuator to form a sinusoidal lap weld on a surface of the workpiece, such that the first battery module component is electrically coupled to the second battery module component.

The present disclosure also relates to a system for welding two components in a battery module that includes a laser source configured to emit a laser beam. Additionally the system has a first actuator coupled to the laser source and configured to move the laser beam along a first axis, a second axis, or both the first and second axes, and a second actuator configured to move a workpiece along the first axis, the second axis, or both the first and second axes, wherein the workpiece comprises a first battery module component and a second battery module component. Finally, the system includes a controller electrically coupled to the laser source, the first actuator, the second actuator, or any combination thereof, wherein the controller is configured to send a signal to the laser source, the first actuator, the second actuator, or any combination thereof, to form a sinusoidal lap weld on a surface of the workpiece, such that the first battery module component is electrically coupled to the second battery module component.

The present disclosure further relates to a method for welding two components in a battery module that includes directing a laser beam from a laser source to a first surface of a first conductive component of the battery module disposed opposite a second surface of the first conductive component, wherein the second surface is disposed against a third surface of a second conductive component of the battery module. Additionally, the method includes moving the laser beam, via an actuator, in an oscillating pattern along the first surface of the first conductive component to weld the first conductive component to the second conductive component.

The present disclosure further relates to a battery module that includes a housing and a lithium ion battery cell disposed in the housing. The battery module also has a battery module terminal electrically coupled to the lithium ion battery cell via an electrical pathway, and the battery module terminal is configured to provide an electrical output of the battery module when coupled to an electrical load, and the electrical pathway comprises a first conductive component and a second conductive component. Additionally, the battery module includes a lap weld electrically coupling the first and second conductive components to one another, wherein the lap weld is produced according to a laser welding process. The laser welding process includes directing a laser beam from a laser source to a first surface of the first conductive component disposed opposite a second surface of the first conductive component, wherein the second surface is disposed against a third surface of the second conductive component, and moving the laser beam in an oscillating pattern along the first surface of the first conductive component to weld the first conductive component to the second conductive component.

DRAWINGS

Various aspects of this disclosure may be better understood upon reading the following detailed description and upon reference to the drawings in which.

DETAILED DESCRIPTION

Figure 1:
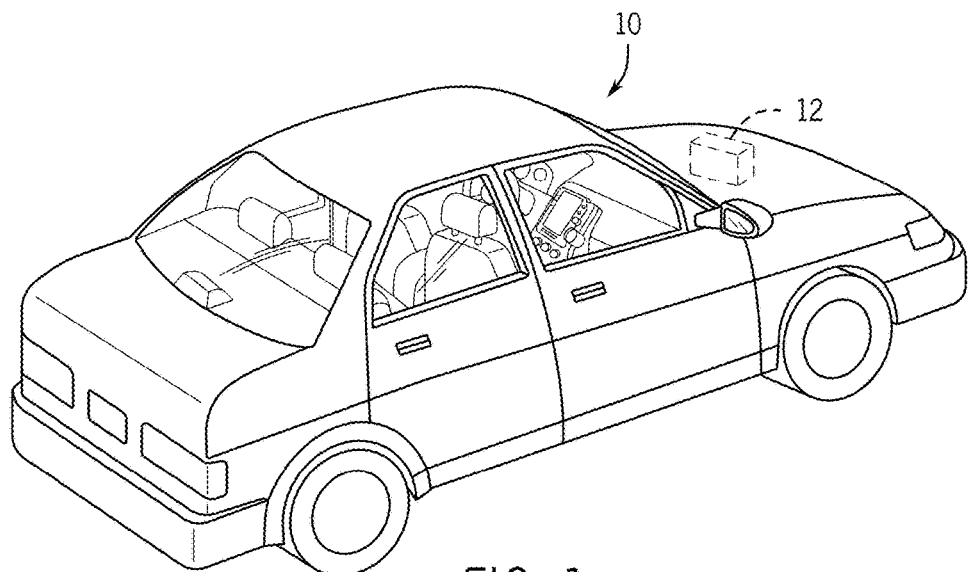
FIG. 1 is a perspective view of an xEV having a battery system configured to provide power for various components of the xEV, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The welding techniques described herein may be used in battery systems that provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

During assembly of a battery module, the individual electrochemical cells may be positioned in a housing of the battery module, and terminals (e.g., minor terminals or cell terminals) of the electrochemical cells may extend generally away from the housing. To couple the electrochemical cells together (e.g., in series or parallel), an electrical path between minor terminals of two or more electrochemical cells may be established by coupling pairs of minor terminals via corresponding bus bars (e.g., minor bus bars). Further, two of the electrochemical cells (e.g., on either end of the battery module or on ends of one or more stacks of electrochemical cells) may be electrically coupled to major terminals (e.g., module terminals or primary terminals) of the battery module via corresponding major bus bars, or via corresponding major bus bar assemblies, where the major terminals are configured to be coupled to a load for powering the load. In traditional configurations, to ensure that the major terminals and their associated major bus bars do not become decoupled, the major terminals and major bus bars may be welded together. Unfortunately, some of these welds may be difficult to make, or may be less than optimal because of the nature of the material (e.g., copper). For example, certain welding methods (e.g., tungsten inert gas welding), may be sufficient to produce a strong connection, but may generally employ a weld material that is not compatible with the conductive materials (e.g., causing galvanic effects). Additionally, some welding methods may be too imprecise for certain connections in the battery module. In addition, typical welding processes may be subject to spattering, which can negatively affect certain battery module components (e.g., causing shorts in electronics).

Laser welding, on the other hand, does not generally require an additional welding material, but is generally used for foils (e.g., relatively thin work pieces, such as less than 0.5 mm) Further, laser welding is generally limited in use due to power density constraints, the high reflectivity of certain conductive materials (e.g., copper), and the high heat dissipation of the conductive materials. It is now recognized that the presently disclosed techniques of laser welding may be performed to achieve strong, clean welds (e.g., compared to other laser welding methods) on certain conductive (e.g., copper) components of the battery module having a thickness greater than would otherwise be appropriate. It is also now recognized that the disclosed techniques may be particularly applicable to battery module connections close to the electronics (e.g., a printed circuit board) of the battery module because the electronics are sensitive to spatter.

The presently disclosed welding techniques are particularly applicable to and effective for copper components, but may also be useful for welding components having other materials in lieu of or in addition to copper, to produce a weld (e.g., a lap weld). Accordingly, while the discussion below is presented in the context of laser welding copper, it is believed that the process may be used for other materials. It is now recognized that copper components in battery modules may be especially difficult to laser weld due to a number of factors, including the highly reflective nature of copper and the high thermal conductivity of copper, as well as the thickness of the copper components. Present embodiments facilitate attachment of copper to copper despite such obstacles.

To enable a strong laser weld to be produced between battery system components, the present disclosure includes embodiments where a laser used for the welding process provides a relatively high power and a relatively small spot size (e.g., a relatively small spot where the laser emission is incident on the component or components to be welded), which provides an appropriate power density for the relatively thick components. For example, the laser may include a power density of between 0.1 and 30 Megawatts per square centimeter ("MW/cm$^2$"); 0.5 and 25 MW/cm$^2$; 1 and 20 MW/cm$^2$; or 5 and 18 MW/cm$^2$. Additionally, the laser may have a spot size of between 0.01 and 20 millimeters ("mm"); 0.01 and 10 mm; 0.05 and 5 mm; or 0.1 and 1 mm.

In certain embodiments, the laser emission may be a continuous wave emission, as opposed to a pulsed emission, to enable consistent power density, as described below. Because the spot size produced by the laser is relatively small, the laser weld has high accuracy and precision. However, it is now recognized that while such accuracy and precision is desirable, it may also be desirable for the weld area to be larger than the spot size. In this regard, the presently disclosed welding techniques may also utilize oscillating patterns of the laser's emission so that the weld so produced has a desirable size. In accordance with one aspect of the present disclosure, the laser emission (e.g., continuous wave emission) is oscillated in one direction (e.g., back and forth along a first axis) while the emission is moved in another direction (e.g., from one side to another along a second axis). These and other features will be described in further detail below.

To help illustrate, FIG. 1 is a perspective view of an embodiment of a vehicle 10, which may utilize a battery system 12 that includes one or more welds described in the present disclosure. It is now recognized that it is desirable for the non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system (e.g., a standard 12V lead acid battery). For example, as illustrated, the vehicle 10 may include the battery system 12 positioned similarly to a lead-acid battery of a combustion-engine vehicle (e.g., under the hood of the vehicle 10).

Figure 2:
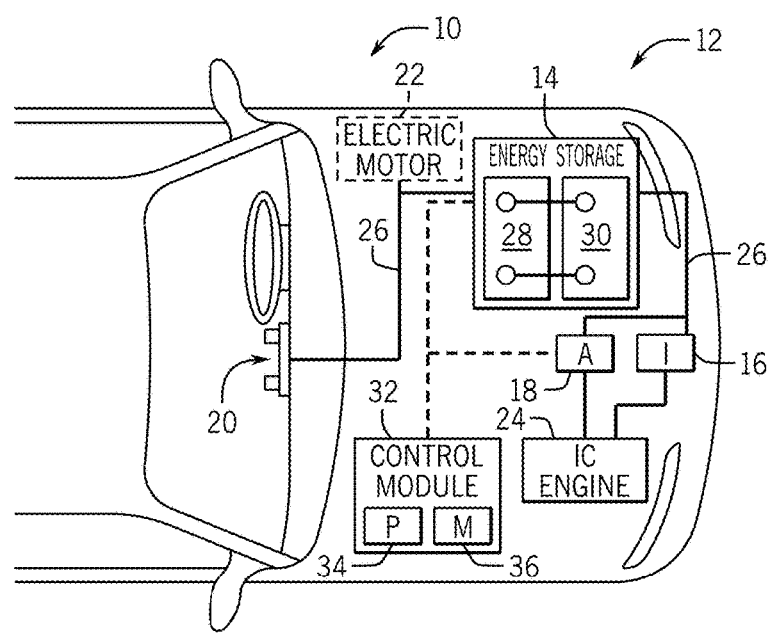
FIG. 2 is a cutaway schematic view of an embodiment of the xEV that utilizes the battery system of FIG. 1, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical components in the vehicle 10. Additionally, the energy storage component 14 may output electrical energy to start (e.g., re-start or re-ignite) an internal combustion engine 24. For example, in a start-stop application, to preserve fuel the internal combustion engine 24 may idle when the vehicle 10 stops. Thus, the energy storage component 14 may supply energy to re-start the internal combustion engine 24 when propulsion is demanded by the vehicle 10.

Therefore, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled (e.g., via a weld) to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. The bus 26 may be coupled to the energy storage component 14 via one or more welds, as will be described in more detail herein.

Additionally, as depicted, the energy storage component 14 may include multiple battery modules. For example, in the depicted embodiment, the energy storage component 14 includes a lithium ion (e.g., a first) battery module 28 and a lead acid (e.g., a second) battery module 30, which each includes one or more battery cells. Additionally, the energy storage component 14 may include any number of battery modules, all or some of which may include welds performed using the presently disclosed techniques. Although the lithium ion battery module 28 and lead-acid battery module 30 are depicted adjacent to one another, they may be positioned in different areas around the vehicle 10. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32 (e.g., a battery management system). More specifically, the control module 32 may control operations of components in the battery system 12, such as relays (e.g., switches) within the energy storage component 14, the alternator 18, and/or the electric motor 22. For example, the control module 32 may regulate an amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processor units 34 and one or more memory components 36. More specifically, the one or more processor units 34 may include one or more application specific integrated circuits (ASICs), one or more field programmable gate arrays (FPGAs), one or more general purpose processors, or any combination thereof. Additionally, the one or more memory components 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled (e.g., via a weld) in parallel to the vehicle's electrical system via the bus 26.

It is now recognized that that the presently disclosed techniques of laser welding may be performed to achieve strong, clean welds on certain conductive (e.g., copper) components of battery modules, such as those included in the energy storage component 14. It is also now recognized that the disclosed techniques may be particularly applicable to battery module connections close to the electronics (e.g., the printed circuit board) of the battery module because such electronics are sensitive to spatter. Further, it is now recognized that the disclosed techniques may be used to weld components of battery modules disposed in a plastic housing without causing damage to the housing due to heat exposure.

Figure 3:
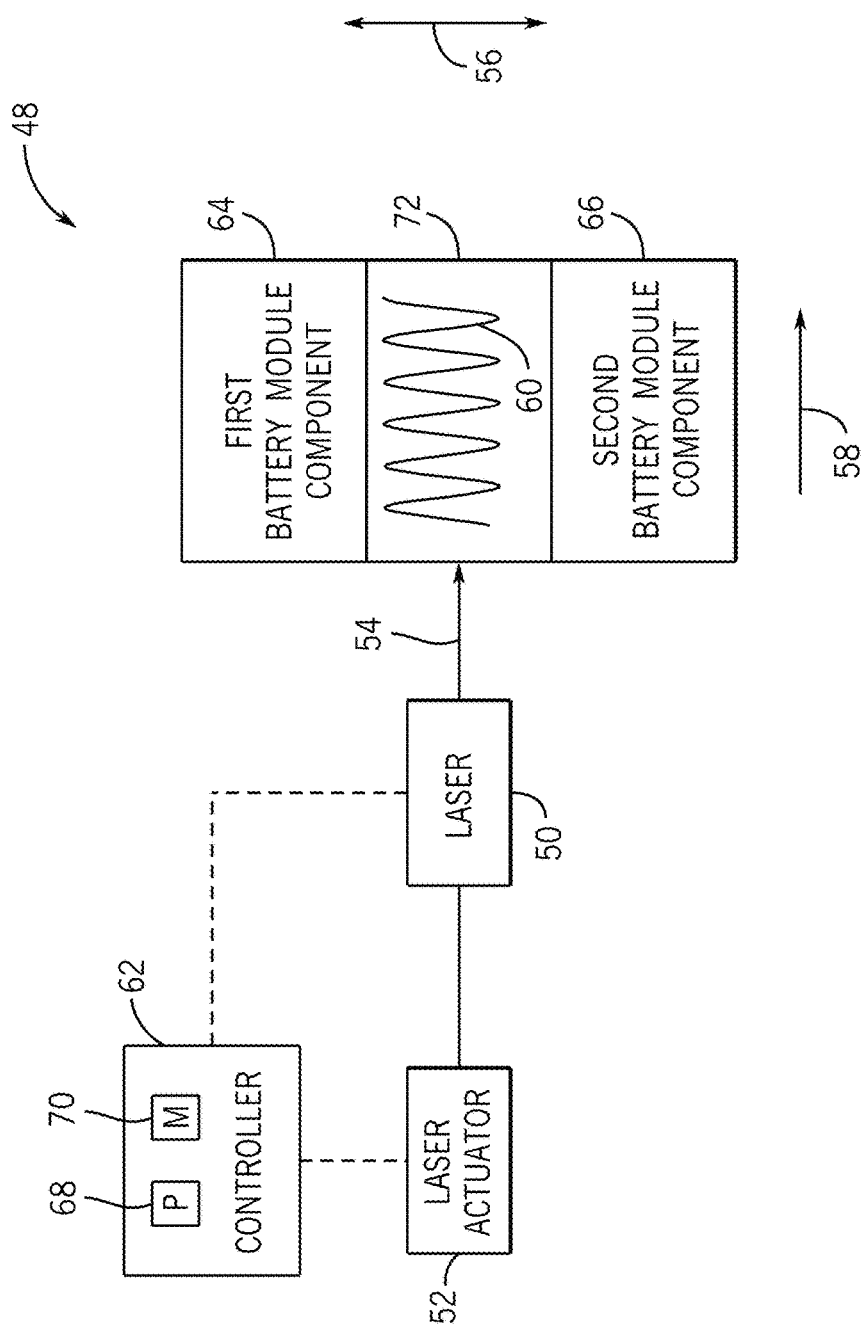
FIG. 3 is a block diagram of an embodiment of a laser welding system for welding two battery module components to one another, in accordance with an aspect of the present disclosure.

FIG. 3 is a block diagram of an embodiment of a laser welding system 48 in accordance with the present disclosure. As shown, a laser 50 may be coupled to a laser actuator 52, where the laser actuator moves the laser 50 and/or the laser's emission (e.g., beam) 54 in one or more directions. For example, the laser actuator 52 may include various servomechanisms, mirrors, or the like, configured to move (e.g., via a galvanometer) the laser 50 and/or the laser beam 54 in an oscillating pattern along a first direction 56, while also moving the laser 50 and/or the laser beam 54 in a second direction 58 (e.g., generally crosswise relative to the first direction, such as perpendicular), for example to produce a sinusoidal pattern 60. For example, when the laser actuator 52 includes a mirror, the mirror may be configured to undergo angle adjustments, such that the laser beam 54 moves in the oscillating pattern in the first direction 56 and/or in the second direction 58. The oscillation of the laser beam may be a back-and-forth straight movement, or a pendulous movement combined with a displacement of the workpiece, as will be described in more detail with respect to FIGS. 5-8. In other embodiments, the laser beam may be oscillated while the welded components (e.g., a first component 64 and a second component 66) are moved in a synchronous fashion to produce the oscillating pattern. The movement of the workpiece may be via a conveyor belt, a robotic actuator, or some other actuation mechanism.

The laser actuator 52 and laser 50 may be communicatively coupled to a controller 62, which is intended to include any appropriate control device or control components, such as one or more processor units 68 and one or more memory components 70, programmable circuitry, and so forth. More specifically, the one or more processor units 68 may include one or more application specific integrated circuits (ASICs), one or more field programmable gate arrays (FPGAs), one or more general purpose processors, or any combination thereof. Additionally, the one or more memory components 70 may include volatile memory, such as random access memory (RAM), and/or non-volatile memory, such as read-only memory (ROM), optical drives, hard disc drives, or solid-state drives.

In certain embodiments, the controller 62 may control the laser actuator 52, the laser 50, or both. For example, the controller 62 may control the laser emissions while monitoring and/or adjusting the lasers beam 64 position via the laser actuator 52 to enable the laser beam 64 to produce a desired oscillating pattern. The emission produced by the laser 50 may be pulsed, but it may be desirable for the emission to be a continuous wave emission to enable the power density to be consistent along the oscillated pattern 60. In certain embodiments where the movement of the laser beam 54 causes it to be closer to a surface of the first component 64 and/or the second component 66 for a portion of the oscillation period, the controller 62 may also adjust the laser power to coincide with the change in distance of the laser from the surface.

As also shown in FIG. 3, the first component 64 (e.g., a copper component) and the second component 66 (e.g., a copper component) of the lithium ion battery module 28 are disposed adjacent to one another in a partially overlapping relationship. That is, a portion of the first component 64 overlaps with a portion of the second component 66. The oscillated pattern 60 of the laser beam 54 is directed within this overlapping area 72 of the first 64 and second 66 components of the battery module to produce what may be referred to as an oscillated laser lap weld. More specifically, the laser beam 54 may be directed onto a surface of the first component 64, where the surface is within the overlapping area 72.

The welding system 48 of FIG. 3 may be desirable when welding components 64 and 66 in the battery module 28 because the welding system 48 may distribute heat more efficiently than other welding techniques, meaning the temperature of the components 64 and 66 does not significantly increase. Thus, when making such welds in a housing constructed of heat-sensitive material (e.g., plastic), it is desirable to transfer as little heat from the weld components 64 and 66 to the housing to avoid any damage to the housing. Additionally, it is desirable to avoid transferring significant amounts of heat to any electronics (e.g., the printed circuit board) present in the battery module housing to avoid damaging such components. An exploded view of a typical battery module 28, including a housing 80 and various electronic components (including components electrically coupled via welds in accordance with present embodiments), is illustrated in FIG. 4.

Figure 4:
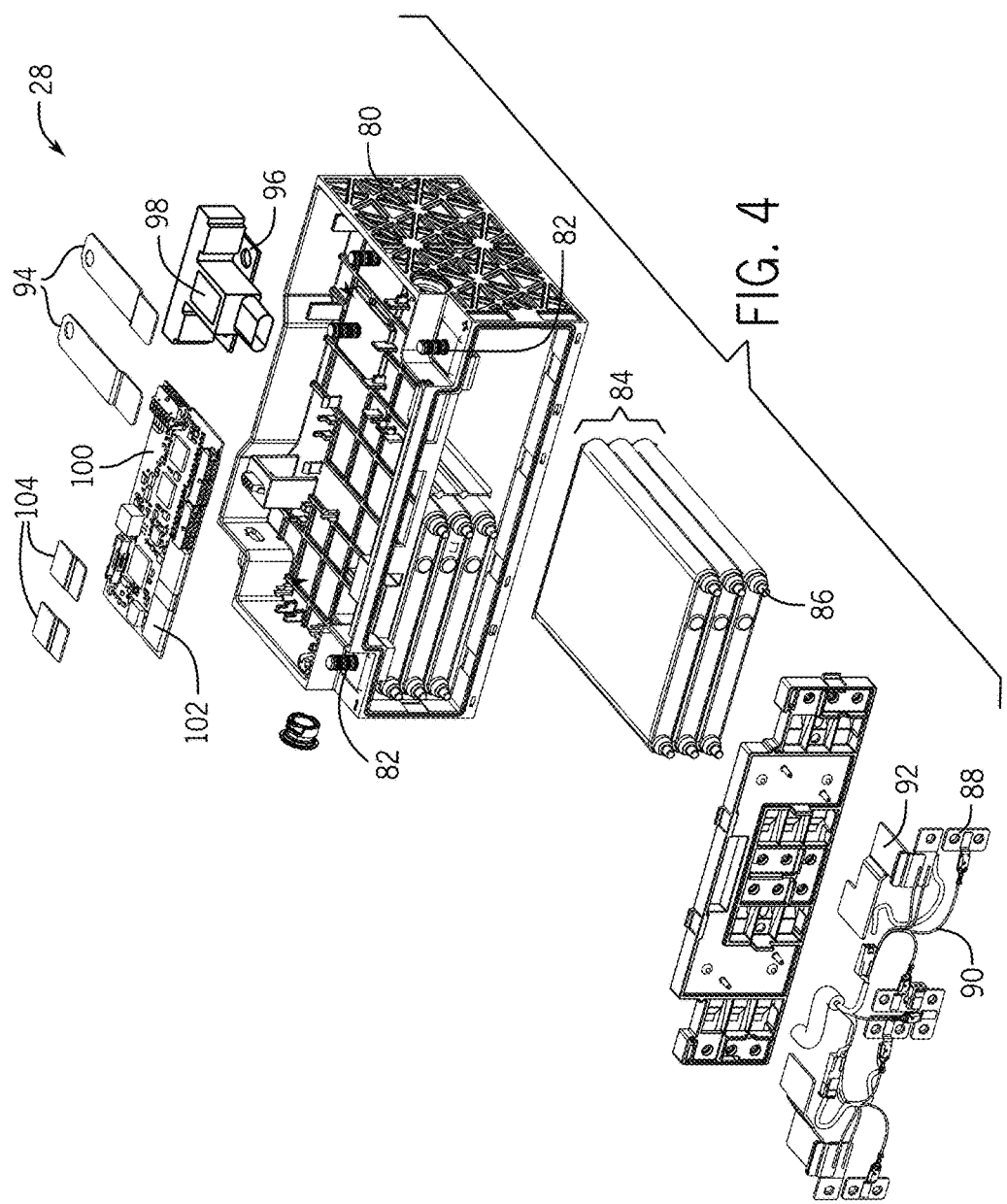
FIG. 4 is an exploded view of a battery module that may include one or more oscillated welds, in accordance with an aspect of the present disclosure.

As shown in FIG. 4, the lithium ion battery module 28 may include several components integrated on or within the housing 80 of the battery module 28. When electrically connected (in accordance with present embodiments), some of these components cooperate to provide an electrical output at terminals 82 of the module. For example, as shown, a plurality of battery cells 84 may be positioned in the module housing 80, and may be electrically connected to the module terminals 82 via a series of physical connections made between certain intervening conductive components. The various interconnections that enable the battery cells 84 to be electrically connected to the terminals 82 of the module 28 may be considered to establish an electrical pathway, the nature of which may depend on the type and number of intervening conductive components.

As set forth in FIG. 4, the components establishing the electrical pathway between the battery cells 84 and the module terminals 82 may include, by way of non-limiting example, cell terminals 86, cell bus bars 88, cabling 90, terminal bus bars 92, relay bus bars 94, relay connectors 96, the relay 98, and the module terminals 82. Additional electrical connections may also be established, for example to enable a control module on a printed circuit board ("PCB") 100 to monitor and control operational parameters of the battery cells 84 and the overall battery module 28. As shown, such electrical connections may be established using a shunt 102 connected to the PCB 100, as well as shunt bridges 104. Again, these features are examples, and should not be considered to limit the present disclosure. These features of the battery module 28 may be coupled together in accordance with present embodiments and may be generically represented as components 64 and 66.

Certain welding methods (e.g., tungsten inert gas welding), may be sufficient to produce a strong connection between conductive components, but may generally employ a weld material because it is compatible with the conductive materials and may be too imprecise for certain connections in the battery module 28. In addition, typical welding processes may be subject to spattering, which can negatively affect certain battery module components (e.g., the printed circuit board 100). Therefore, the laser welding system 48 of FIG. 3 may be desirable to weld the components 64 and 66 of the battery module 28. The laser 50 creating the weld may oscillate in a variety of ways, as described herein with respect to FIGS. 5-8.

Throughout the discussion of FIGS. 5-8, a set of axes will be referenced. The axes include a lateral axis 110, a longitudinal axis 112, and a vertical axis 114. The lateral axis 110 extends side to side, the longitudinal axis 112 extends front to back, and the vertical axis 114 extends up and down.

Figure 5:
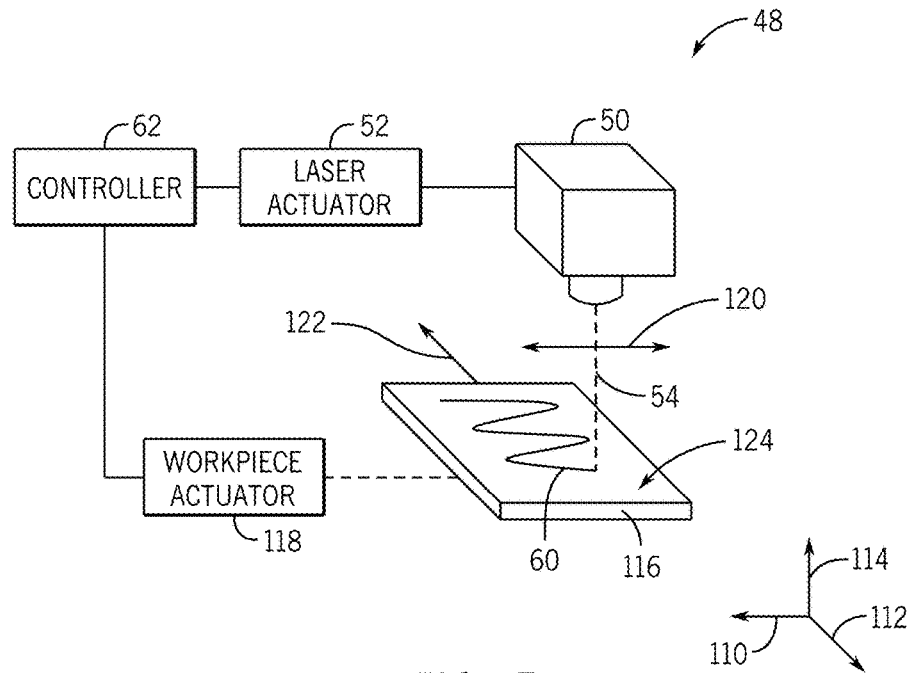
FIG. 5 is an embodiment of a welding system that produces an oscillated weld, where a laser moves in a straight back-and-forth motion along a first axis and a workpiece moves along a second axis, in accordance with an aspect of the present disclosure.
Figure 6:
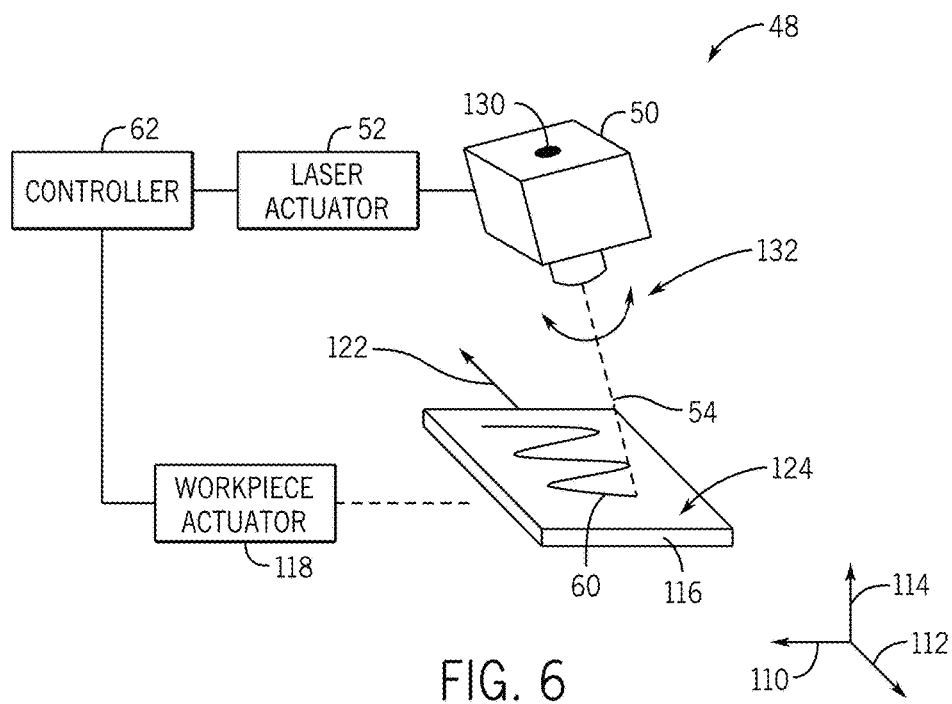
FIG. 6 is an embodiment of a welding system that produces an oscillated weld, where a laser moves in a pendulous motion about an axis and a workpiece moves along the axis, in accordance with an aspect of the present disclosure.

In certain embodiments, oscillation of the laser beam 54 may be achieved by a back-and-forth straight movement of the laser 50 (e.g., via the laser actuator 52) along the lateral axis 110, as shown in FIG. 5. Alternatively, oscillation may occur by rotating the laser 50 in a pendulous motion about the longitudinal axis 112, as shown in FIG. 6. In both the illustrated embodiments of FIGS. 5 and 6, a workpiece 116 (e.g., stacked components 64 and 66) is also displaced along the longitudinal axis 112. The workpiece 116 may move via a conveyor belt, a robotic actuator, or some other actuation mechanism (e.g., a workpiece actuator 118) that is controlled by the controller 62.

More specifically, in FIG. 5 the laser 50 moves in a back-and-forth motion 120 along the lateral axis 110 as the workpiece 116 is simultaneously moved in one direction 122 along the longitudinal axis 112. The simultaneous motion of the laser 50 and the workpiece 116 creates the sinusoidal, or oscillating, pattern 60 on a surface of the workpiece 124. In certain embodiments, the motion of the laser 50 and the workpiece 116 may both be controlled by the controller 62 (e.g., the controller 62 sends two signals to generate the oscillating pattern 60). For example, the controller 62 may send a first signal to the laser actuator 52 to move the laser in the back-and-forth motion 120 along the lateral axis 110. Similarly, the controller 62 may send a second signal to the workpiece actuator 118 to move the workpiece along the longitudinal axis 112 in direction 122. In other embodiments, the system 48 may include two controllers, one to control the motion of the laser 50 and the other to control the movement of the workpiece 116.

In FIG. 6, the laser 50 is configured to rotate about the longitudinal axis 112, but to remain stationary at a point 130 along the lateral axis 110. For example, the laser may swing in a pendulum motion 132 about the longitudinal axis 112 such that the laser beam 54 is directed to different locations on the workpiece surface 124 along the lateral axis 110, but the laser 50 remains fixed at the point 130 (e.g., not move about the lateral axis 110). Such a configuration may use less moving parts than the embodiment illustrated in FIG. 5.

Figure 7:
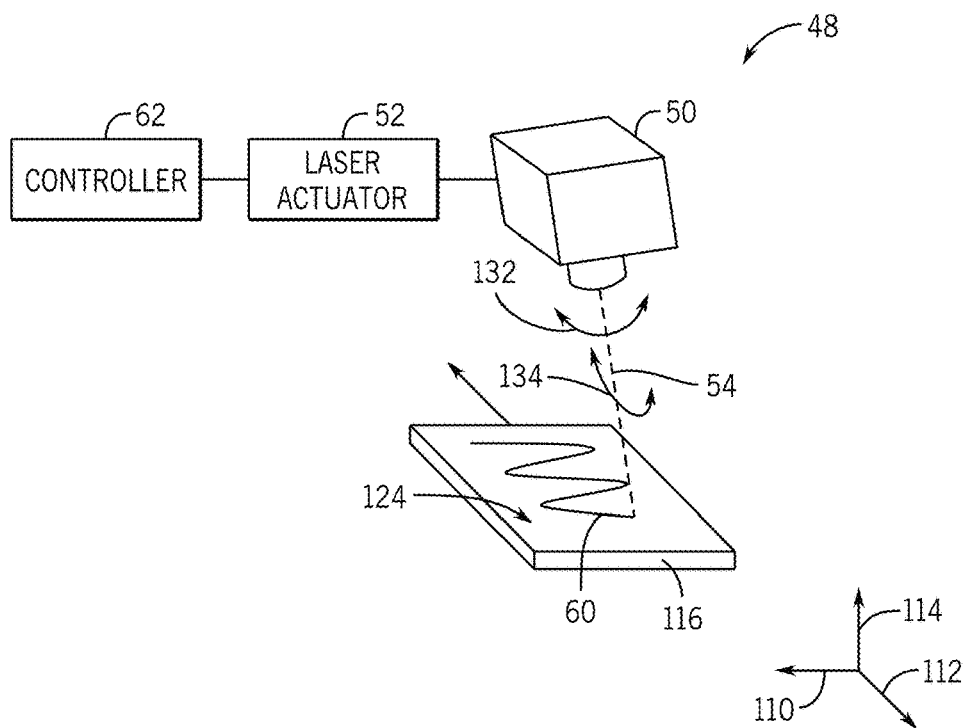
FIG. 7 is an embodiment of a welding system that produces an oscillated weld, where a laser moves in a pendulous motion about a first axis and in a pendulous motion about a second axis, in accordance with an aspect of the present disclosure.

In other embodiments, the oscillating pattern 60 may be produced by moving only the laser 50. Indeed, as shown in FIG. 7 the laser 50 may have a first pivot 132 that creates a pendulous motion about the longitudinal axis 112 and a second pivot 134 that creates a pendulous motion about the lateral axis 110. In certain embodiments, when the laser 50 is configured to rotate about the lateral axis 110 and the longitudinal axis 112, the strength of the laser beam 54 may be more powerful at certain locations along the surface 124 of the workpiece 116 than in other locations. Employing the same strength of the laser beam 54 along the surface of the workpiece 116 may create an inconsistent weld because of the varying distance between the laser 50 and the surface 124 of the workpiece 116. Therefore, the controller 62 may be configured to adjust the power of the laser beam 54 such that the applied strength of the laser beam 54 is consistent along the entire surface 124 of the workpiece 116. The embodiment illustrated in FIG. 7 may be advantageous because it may only use the laser actuator 52 to rotate the laser 50 about the lateral axis 110 and the longitudinal axis 112. However, in other embodiments, two actuators may be used, one to rotate the laser 50 about the lateral axis 110 and one to rotate the laser about the longitudinal axis 112.

Figure 8:
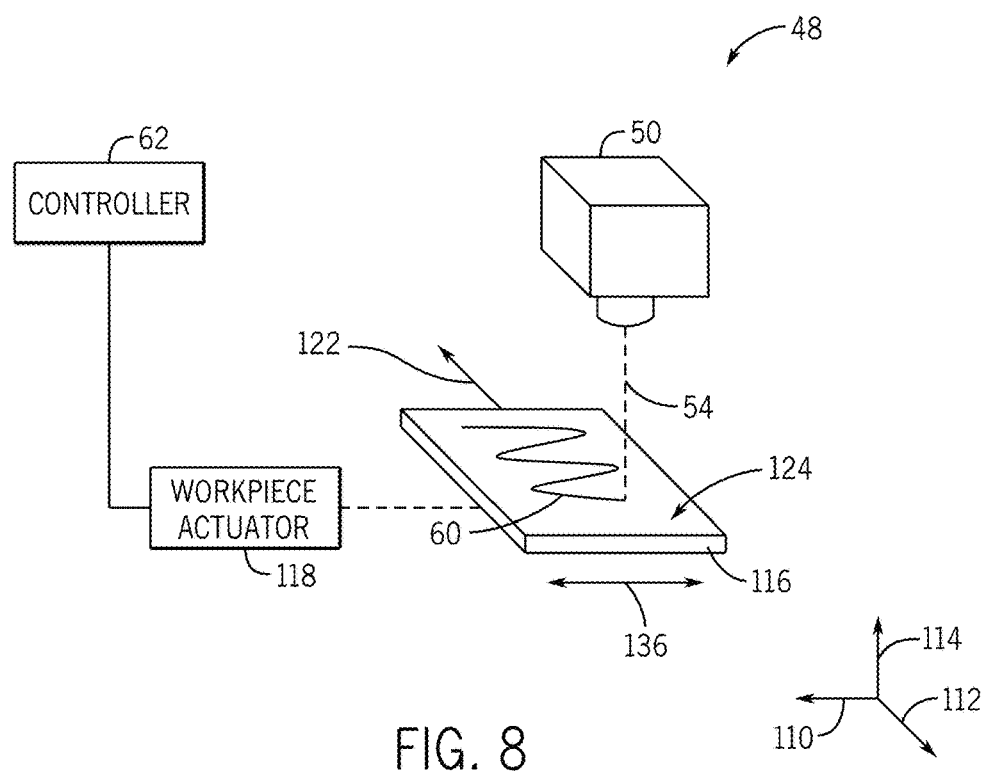
FIG. 8 is an embodiment of a welding system that produces an oscillated weld, where a workpiece moves in a straight back-and-forth motion along a first axis and the workpiece moves along a second axis, in accordance with an aspect of the present disclosure.

FIG. 8 illustrates an embodiment of the disclosed welding system 48 where the laser 50 and the laser beam 54 remain fixed and the workpiece 110 is moved to form the oscillating pattern 60 on the workpiece surface 124. In certain embodiments, the laser 50 and laser beam 54 may remain completely fixed along the lateral axis 110, the longitudinal axis 112, and the vertical axis 114. Accordingly, the workpiece 116 may be moved along the lateral axis 110 in a back-and-forth motion 136 and along the longitudinal axis 112 in direction 122, via the workpiece actuator 118, to create the oscillating pattern 60. For example, the workpiece 116 may be simultaneously moved in the back-and-forth motion 136 along the lateral axis 110 and in the direction 122 along the longitudinal axis 112 to form the oscillating pattern 60. In certain embodiments, the controller 62 may send signals to two workpiece actuators, where one actuator moves the workpiece back-and-forth 136 along the lateral axis 110 and the other moves the workpiece along the longitudinal axis 112 in direction 122.

It should be noted that in certain embodiments, the welding system 48 may be configured to move the laser 50 about the longitudinal axis 112 and about the lateral axis 110 in a pendulous motion while simultaneously moving the workpiece 116 along the lateral axis 110 and along the longitudinal axis 112. In other embodiments, the welding system 48 may include any combination of moving the laser 50 about the longitudinal axis 112, about the lateral axis 110, or about both the longitudinal 112 and the lateral 110 axis and/or moving the workpiece 116 along the lateral axis 110, along the longitudinal axis 112, or along both the lateral 110 and longitudinal 112 axis.

Figure 9:
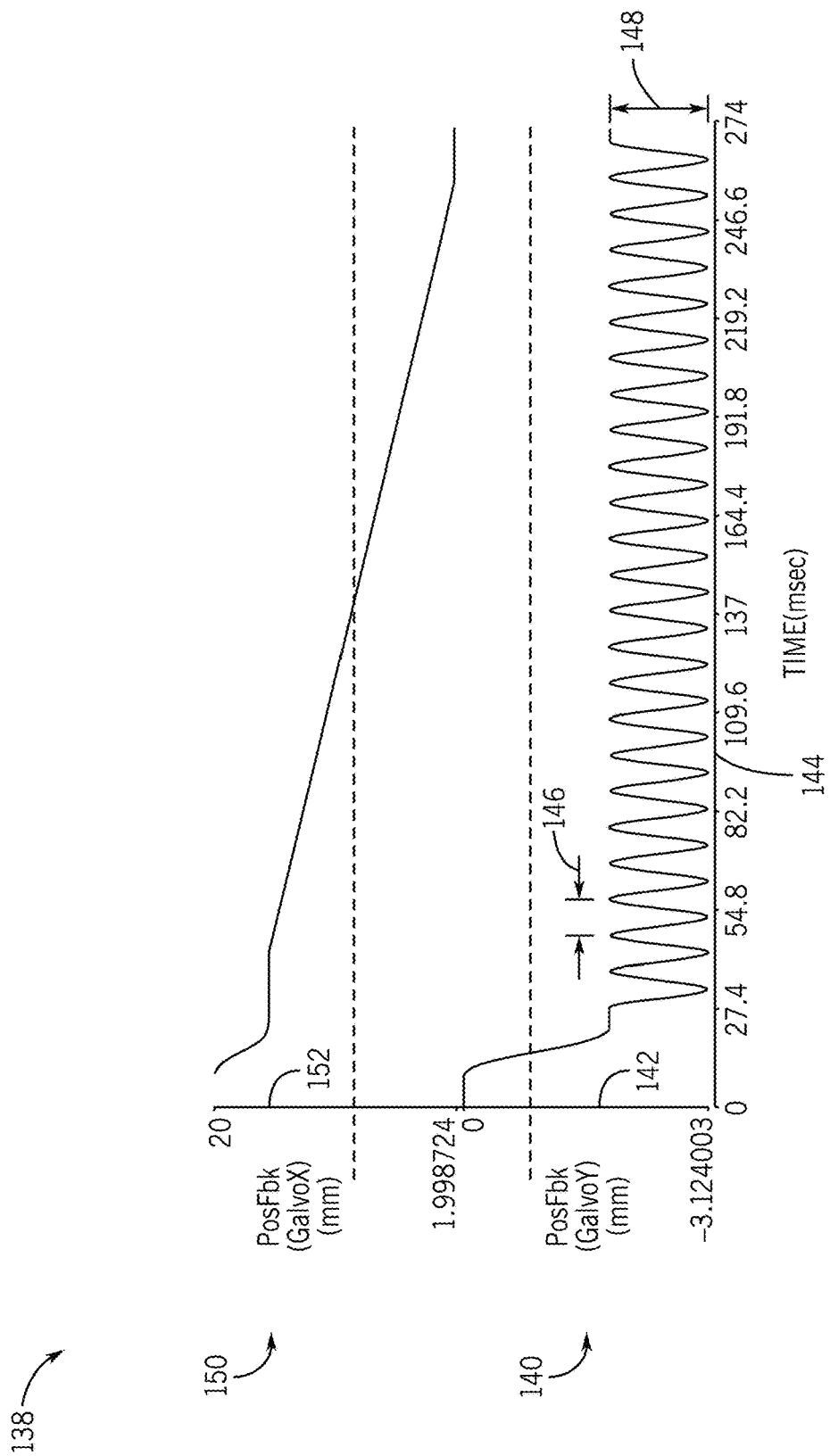
FIG. 9 is a plot of an embodiment of an oscillating pattern of a laser weld, in accordance with an aspect of the present disclosure.

FIG. 9 depicts a plot 138 of an embodiment of the oscillating pattern (e.g., back-and-forth) of the laser 50 along the lateral axis 110 and the displacement of the workpiece 116 along the longitudinal axis 112. In FIG. 9, a lower chart 140 graphically illustrates an oscillating movement of the laser beam 54 along the lateral axis 110, where the Y-axis 142 represents a position of the laser beam 54 with respect to the lateral axis 110 and the X-axis 144 represents time. In certain embodiments, a wavelength 146 of the oscillation may be on the order of an amplitude 148 of the oscillation (e.g., between 0.95 and 1.05 times the amplitude). Such an oscillating pattern has been found to enable a sufficient overlap of energy deposition into the workpiece 116 to produce a continuous weld along the longitudinal axis 112. Additionally, the upper chart 150 of FIG. 9 illustrates that the laser beam 54 or the workpiece 116 has a constant displacement along the longitudinal axis 112, where the Y-axis 152 represents a position of the laser beam 54 or the workpiece 116 with respect to the longitudinal axis 112 and the X-axis 144 represents time.

Figure 10:
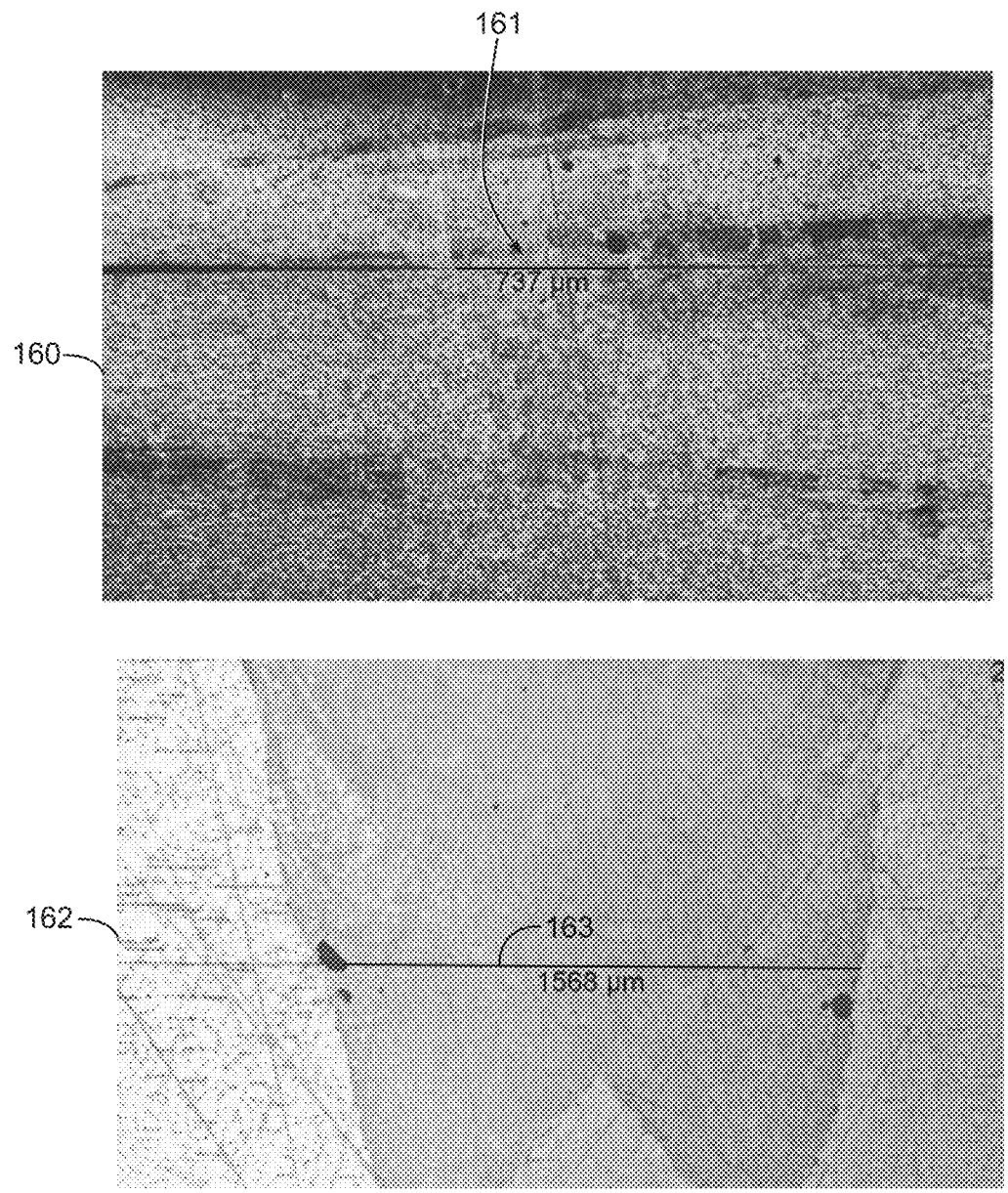
FIG. 10 is an illustration comparing a thickness of a weld using an oscillating pattern and a weld using a non-oscillating pattern, in accordance with an aspect of the present disclosure.

In addition, the oscillating pattern 60 may produce a weld having a bigger fusion width in the direction in which the beam 54 is oscillated, compared to a weld produced using a straight weld trajectory (e.g., a non-oscillated beam). This may be further appreciated with reference to FIG. 10, which illustrates real examples of welded copper components. In particular, FIG. 10 depicts a cross-section 160 of a weld 161 produced using a straight weld trajectory in which the laser beam was not oscillated. For comparison, FIG. 10 also illustrates a cross-section 162 of a weld 163 produced using beam oscillation in accordance with an aspect of the present disclosure. In certain embodiments, the disclosed welding systems may produce a weld having a thickness of between 1000 and 2000 micrometers ("μm"). The welds 161 and 163 shown in FIG. 10 were produced using the same amount of energy input into the welds. However, as shown, the oscillated weld 163 thickness is over twice as large as the conventional weld 161 (e.g., approximately 1568 micrometers versus approximately 737 micrometers).

Figure 11:
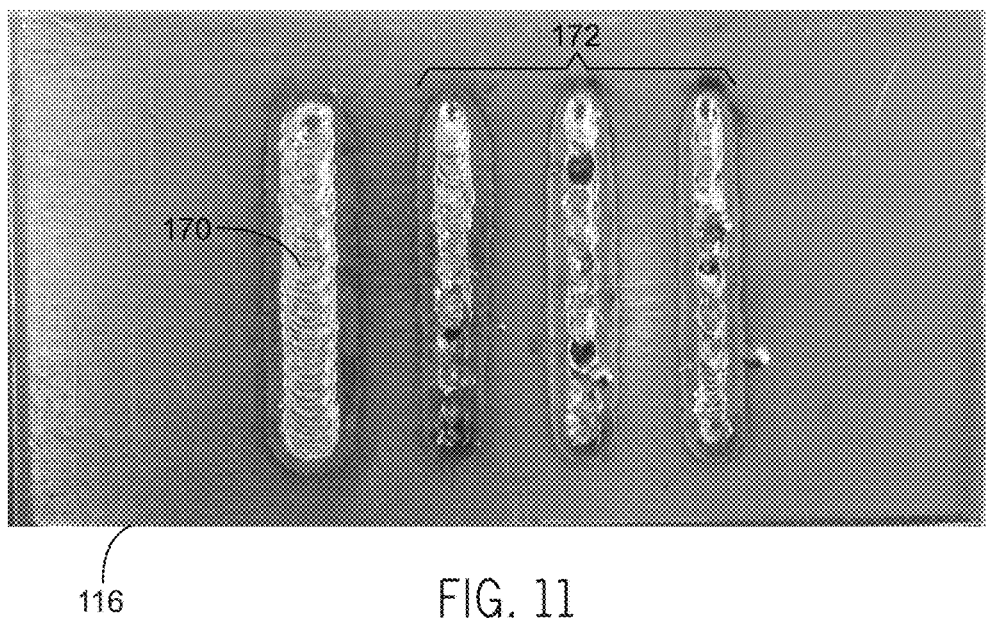
FIG. 11 is an illustration of a copper workpiece that compares an oscillated weld to various non-oscillated welds, in accordance with an aspect of the present disclosure.

Additionally, welds produced using the presently disclosed techniques may be substantially uniform and have greater tensile strength when compared to other welding techniques. FIG. 11 depicts a copper workpiece 116 having an oscillated weld 170 side-by-side with various conventional (e.g., non-oscillated) welds 172 for comparison. As can be seen, the oscillated weld 170 produced in accordance with present techniques appears more continuous, which may be due to the larger area into which the same amount of energy is dissipated when compared to the conventional welds 172. More specifically, the oscillated weld 170 uses the same amount of energy as the conventional welds 172, but, because the laser beam 54 is oscillated, the energy is more evenly distributed and there is more operating headroom for fluctuations in beam output, material composition gradients, and other potential errors (e.g., operator error).

Figure 12:
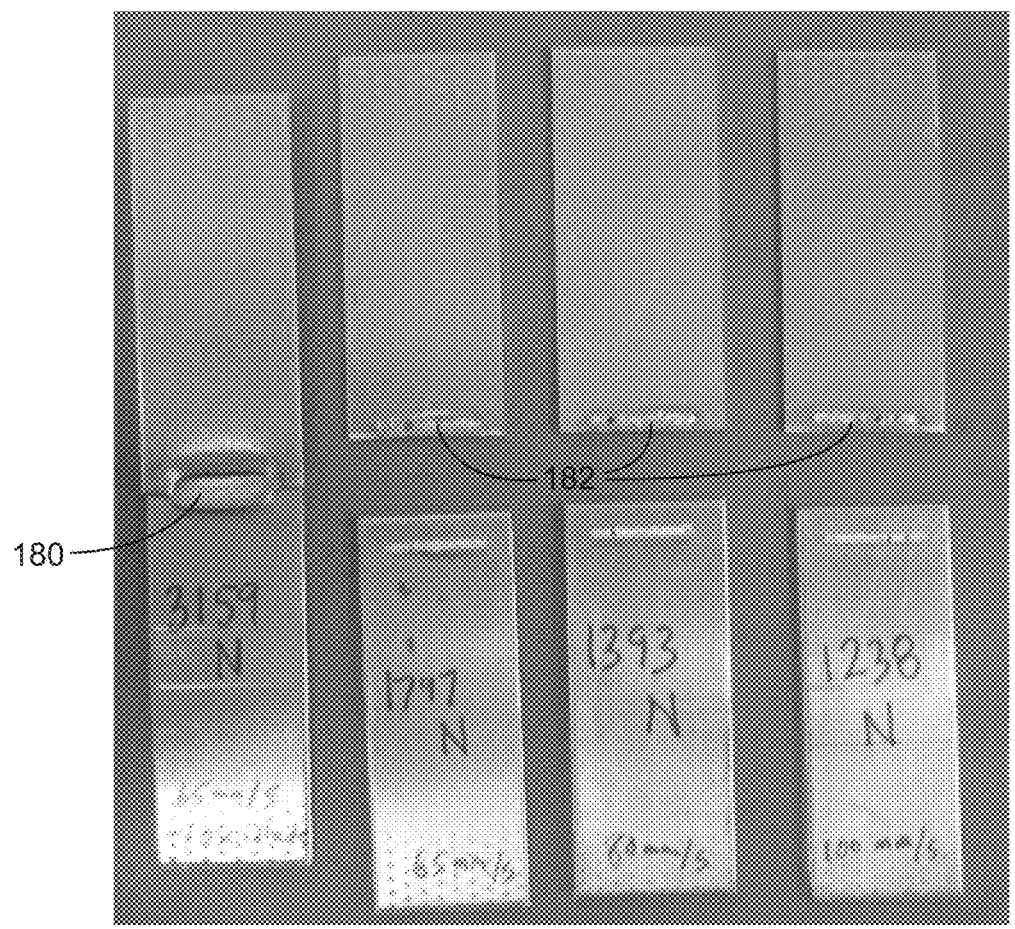
FIG. 12 is an illustration comparing a tensile strength of an oscillated weld to a tensile strength of various non-oscillated welds, in accordance with an aspect of the present disclosure.

It has also been found that oscillating welds have a greater tensile strength than conventional, non-oscillated laser welds. It is believed that this is due, at least in part, to the greater weld thickness enabled by the oscillating pattern compared to the straight weld trajectory. As shown in FIG. 12, an oscillated weld 180 fails at the parent material at the edge of the heat affected zone, while the conventional welds 182 fail at the weld. More specifically, the left-most weld 180 (the oscillated weld) was produced at a 65 millimeter (mm) per second weld rate (with oscillation), while the conventional welds 182 were produced at a 65 mm/sec weld rate, 80 mm/sec weld rate, and 100 mm/sec weld rate. As shown, the slower weld rates for the conventional welds 182 produce a stronger weld than the faster weld rates, but still well below the strength of the oscillated weld 180. All of the welds 180 and 182 illustrated in FIG. 12 were produced with the same laser spot size and laser power. In certain embodiments, oscillated welds produced using the disclosed welding systems may withstand a tensile force of up to 1000 Newtons ("N"), 2000 N, 3000 N, or more than 3000 N.

Even though the oscillated weld 180 is stronger than the conventional weld patterns 182, because the energy is more evenly deposited into the welded components compared to the conventional techniques, there is less heat penetration through the components of the weld. Indeed, in certain embodiments, there is little or no heat penetration through the bottom component of the weld (i.e., the component that does not contact the laser beam).

Figure 13:
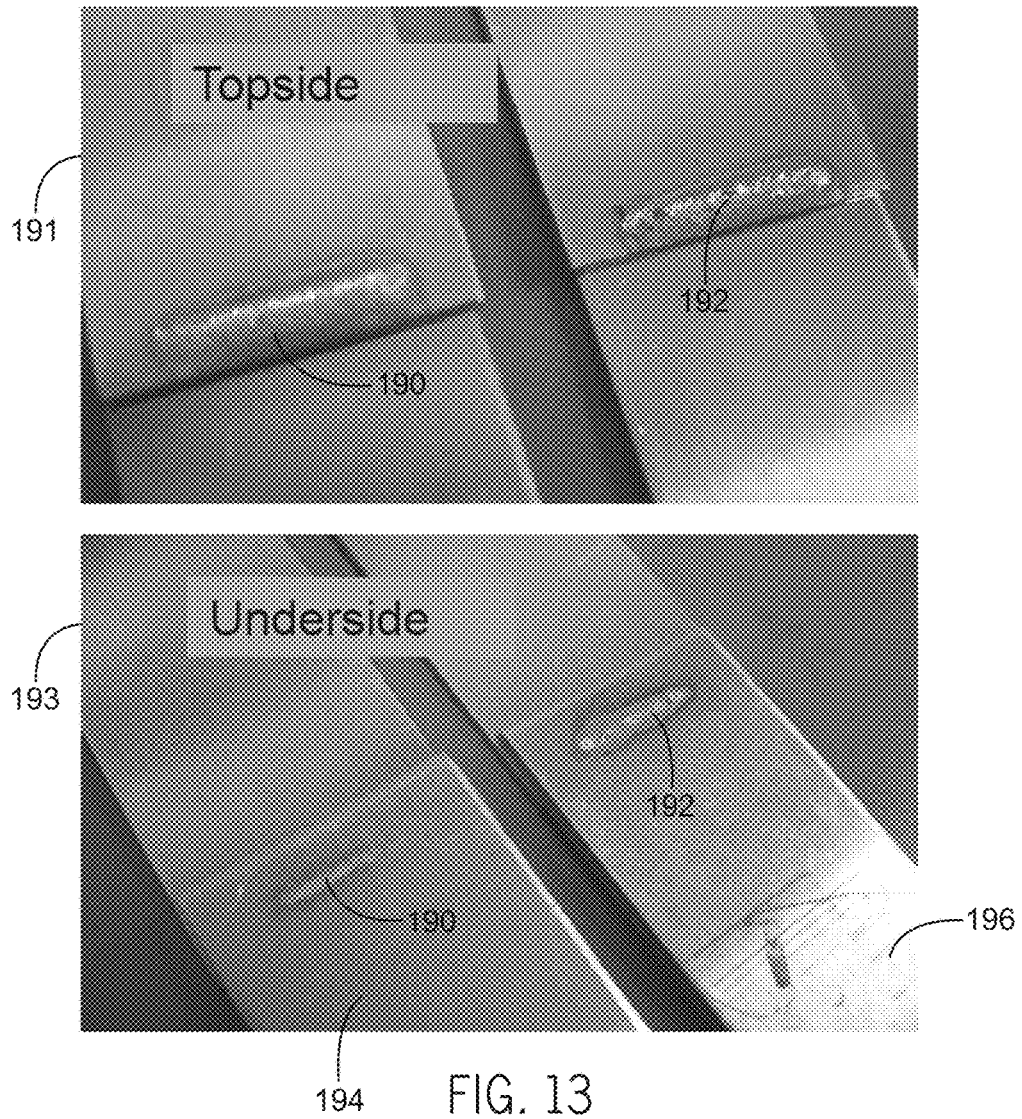
FIG. 13 is an illustration comparing a depth of an oscillated weld to a depth of a non-oscillated weld, in accordance with an aspect of the present disclosure.

FIG. 13 shows the difference in the penetration depth (e.g., heat penetration depth) of an oscillated weld 190 compared to the penetration depth of a conventional weld 192. FIG. 13 illustrates a top view 191 as well as a bottom view 193 of the oscillated weld 190 and the conventional weld 192. As illustrated, the top view 191 shows welding surfaces (e.g., where the laser beam 54 comes into contact with welding components 64 and/or 66) for the welds 190 and 192. Additionally, the bottom view 193 shows a surface of welding components not contacted by the laser beam 54 (e.g., a bottom component of a lap weld). In the oscillated weld 190, the laser beam 54 does not penetrate through a second (e.g., bottom) component 194, while the laser beam 54 does penetrate through the second (e.g., bottom) component 196 in the conventional weld 192.

As can be seen from FIG. 13, the weld 190 produced using the disclosed techniques has little to no heat penetration, which may be important for situations in which the bottom (e.g., second) component 194 is in-molded into the housing 80 of the battery module 28, is attached to sensitive electronics (e.g., the PCB 100), or similar situations. That is, the process associated with the production of the oscillated weld 190 may be less damaging to the other components of the battery module 28 than the processes associated with conventional welds 192. The oscillated weld 190 may also have a lower electrical resistance compared to the non-oscillated welds 192. For instance, as illustrated in FIG. 13, the conventional weld 192 includes an area where the laser beam or heat fully penetrates through the components 196 of the weld due to localized areas of concentrated energy deposition. These areas may have reduced conductivity due, for example, to discontinuity in the morphology of the weld. Accordingly, the more homogenous weld morphology and greater weld thickness produced using the oscillated weld pattern 190 in accordance with the present disclosure may produce a weld having a lower electrical resistance compared to a non-oscillated weld 192 using the same materials and laser power parameters.

Figure 14:
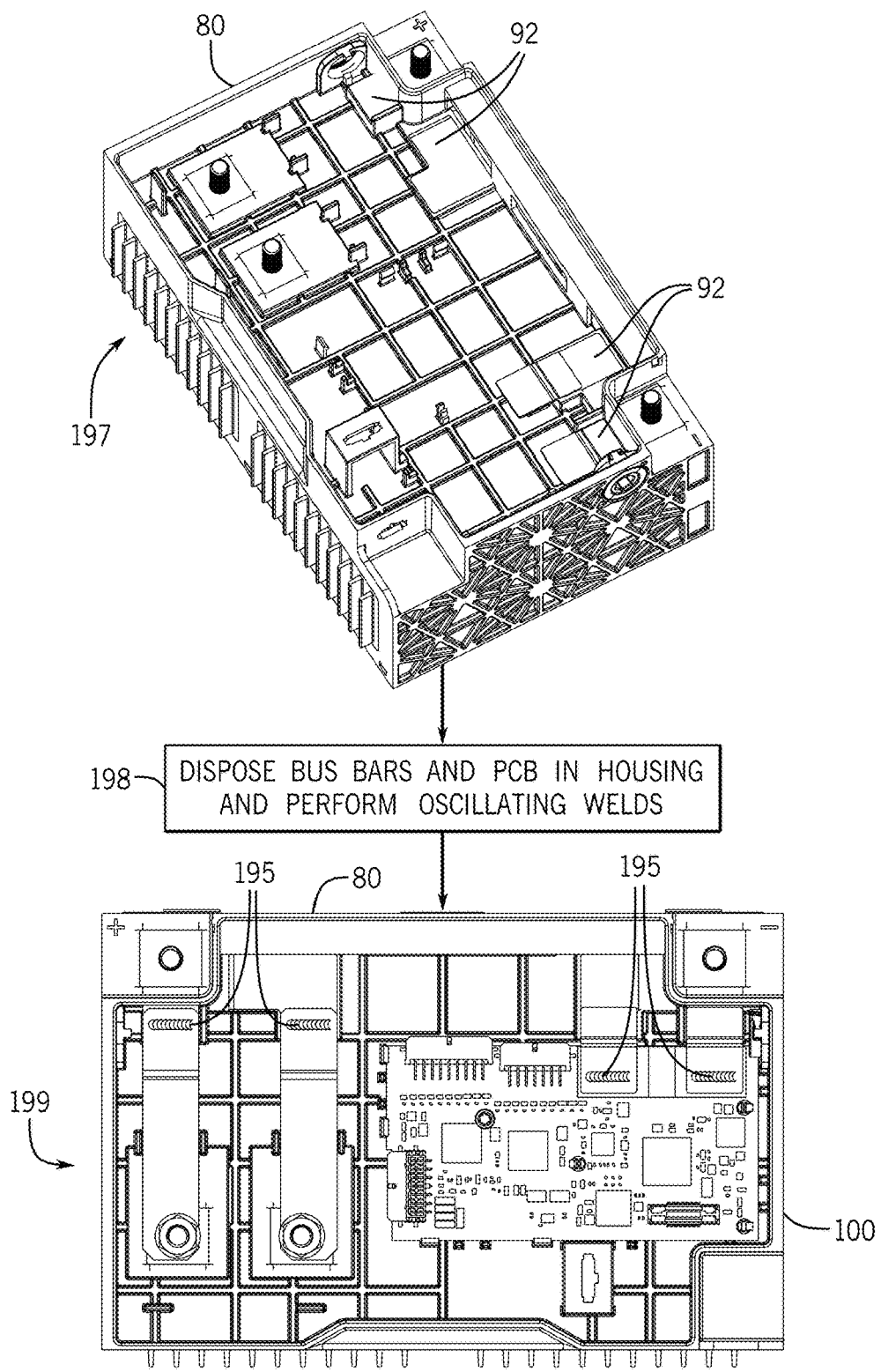
FIG. 14 is an illustration of a battery module housing including in-molded bus bars before welding and after welding, in accordance with an aspect of the present disclosure.

An example configuration of welds 195 in the battery module 28 is shown in FIG. 14. FIG. 14 includes a first block diagram 197 showing the housing 80 (e.g., made of a plastic material) including copper in-molded terminal bus bars 92 before the welds 195 are formed. At block 198, the bus bars 92 and the PCB 100 may be disposed in the housing 80, and the welds 195 may be formed to establish various electrical connections between components (e.g., the bus bars 92, the PCB 100, the battery terminals 86, and the module terminals 82). A second block diagram 199 shows the finished welds 195 in the housing 80. The presently disclosed techniques may enable the welds 195 to be performed even when weld components are disposed in the housing 80, such that little to no damage is caused to the housing 80. The presently disclosed welding techniques distribute energy from the laser beam 54 evenly throughout the components, thereby transferring minimal heat to the housing 80. Additionally, the welding techniques may be performed within the housing 80 without causing damage to other electronic components due to spattering.

Figure 15:
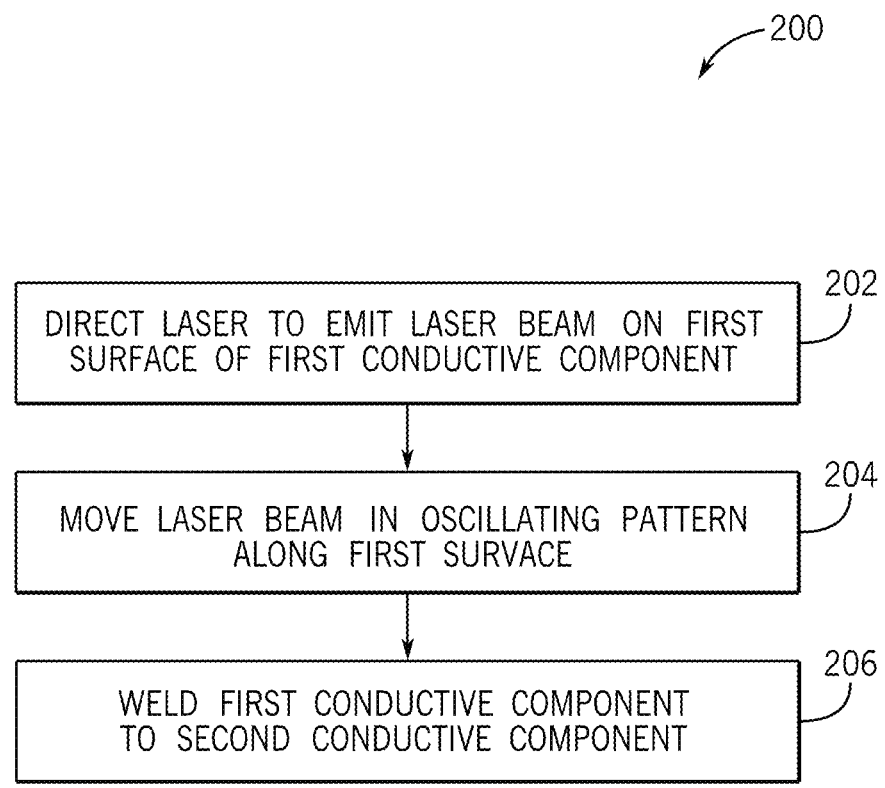
FIG. 15 illustrates an embodiment of a flow chart of a method for controlling a laser to produce an oscillated weld, in accordance with an aspect of the present disclosure.

FIG. 15 illustrates an embodiment of a flow chart 200 of a method for controlling the laser 50 to produce the oscillation pattern 60. At block 202, the controller 62 may send a signal to the laser actuator 52 to direct the laser 50 to emit the laser beam 54 onto a first surface of the first battery module component 64. For example, the controller 62 may instruct an actuator to close a circuit that supplies power to the laser 50, thereby enabling the laser 50 to emit the laser beam 54. At block 204, the controller 62 may send a signal to the laser actuator 52 to move the laser beam 54 along the first surface of the first battery module component 64 in the oscillating pattern 60. Accordingly, at block 206, the laser beam 54 moves along the first surface of the battery module component to weld the first battery module component 64 to the second battery module component 66 (e.g., via a lap weld). In certain embodiments, the controller 62 is configured to adjust a power density of the laser beam 54. For example, when the movement of the laser beam 54 causes it to be closer to a surface of the first component 64 and/or the second component 66 for a portion of the oscillation period, the controller 62 may adjust the power density to coincide with the change in distance of the laser from the surface.

In certain embodiments, the first battery module component 64 has a second surface disposed against a third surface of the second battery module component 66. Therefore, when the laser beam 54 contacts the first surface of the first battery module component 64, a temperature of the first battery module component increases. Heat may be transferred from the first surface of the first battery module component 64 to the second surface of the first battery module component 64. Additionally, heat may be transferred to the third surface of the second battery module component 66, such that a temperature of the second battery module component 66 also increases. The second surface of the first battery module component 64 and the third surface of the second battery module component 66 may then adhere to one another as a result of the increase in temperature, thereby forming a weld.

In certain embodiments, the laser actuator 52 may move the laser beam 54 back-and-forth along the lateral axis 110 and along the longitudinal axis 112. In other embodiments, the controller 62 may simultaneously send a second signal to the workpiece actuator 118 instructing the workpiece actuator 118 to move the workpiece. For example, the workpiece actuator 118 may move the workpiece 116 along the longitudinal axis via a conveyor. In still further embodiments, the controller 62 may send signals only to the workpiece actuator 118. For example, the workpiece actuator 118 may be configured to move the workpiece 116 simultaneously back-and-forth along the lateral axis 110 and along the longitudinal axis 112. In certain embodiments, the laser beam may move along the first surface of the first battery component 64 at a speed of between 50 and 150 mm/sec.

One or more of the disclosed embodiments, alone or on combination, may provide one or more technical effects including the manufacture of battery modules that have a longer life cycle, less weight, and less size, but comparable power output, to lead acid battery modules. Such battery modules may reduce the weight of xEVs and increase fuel efficiency. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system for welding two components in a battery module, comprising:
    a laser source configured to emit a laser beam onto a workpiece comprising a first battery module component and a second battery module component;
    an actuator coupled to the laser source and configured to move both the laser source and the laser beam along a first axis and a second axis, wherein the actuator is configured to move both the laser source and the laser beam in a pendulous motion about the first axis, and move both the laser source and the laser beam in a pendulous motion about the second axis; and
    a controller electrically coupled to the laser source and the actuator, wherein the controller is configured to send a signal to the laser source and the actuator to form a sinusoidal lap weld on a surface of the workpiece, such that the first battery module component is electrically coupled to the second battery module component.

2. The system of claim 1, comprising the first battery module component and the second battery module component being copper components.

3. The system of claim 1, wherein the controller is configured to adjust a power of the laser beam when the laser beam moves along the first axis, the second axis, or both.

4. The system of claim 1, wherein the laser source is configured to emit the laser beam as a continuous wave.

5. The system of claim 1, wherein the laser source is configured to emit the laser beam as a pulsed emission.

6. The system of claim 1, wherein the laser source comprises a power density between 0.1 and 30 Megawatts per square centimeter ($MW/cm^2$) and a spot diameter between 0.01 and 20 millimeters (mm).

7. The system of claim 1, comprising the surface of the workpiece being an overlapping area between the first battery component and the second battery component.

8. The system of claim 1, comprising the first battery component and the second battery component being configured to establish an electrical connection between the battery module and a load.

9. The system of claim 1, wherein the laser beam moves along the first axis at a rate of between 50 and 150 millimeters per second (mm/sec).

10. The system of claim 1, wherein a wavelength of a path of the laser beam on the components that forms the sinusoidal lap weld is between 0.95 and 1.05 times an amplitude of the path of the laser beam on the components that forms the sinusoidal lap weld.

11. The system of claim 1, comprising the sinusoidal lap weld configured to withstand a force of 3000 Newtons (N).

12. The system of claim 1, comprising the sinusoidal lap weld having a thickness of between 1000 and 2000 micrometers (μm).

13. A system for welding two components in a battery module, comprising:
    a laser source configured to emit a laser beam;
    a first actuator coupled to the laser source and configured to move the laser source and the laser beam along a first axis;
    a second actuator configured to move a workpiece along a second axis, crosswise to the first axis, wherein the workpiece comprises a first battery module component and a second battery module component; and
    a controller electrically coupled to the laser source, the first actuator, and the second actuator, wherein the controller is configured to send a signal to the laser source, the first actuator, and the second actuator to form a sinusoidal lap weld on a surface of the workpiece, such that the first battery module component is electrically coupled to the second battery module component.

14. The system of claim 13, wherein the second actuator comprises a conveyor or a robotic actuator.

15. The system of claim 13, wherein the first actuator is configured to move the laser source back and forth along the first axis and the second actuator is configured to move the workpiece along the second axis.

16. The system of claim 13, wherein the first battery module component and the second battery module component comprise copper.

* * * * *

UNITED STATES PATENT AND TRADEMARK OFFICE
CERTIFICATE OF CORRECTION

PATENT NO.          : 10,195,688 B2                             Page 1 of 1
APPLICATION NO.     : 14/631664
DATED               : February 5, 2019
INVENTOR(S)         : John P. Dinkelman It is certified that error appears in the above-identified patent and that said Letters Patent is hereby corrected as shown below:

In the Drawings

1. In Fig. 15, Sheet 12 of 12, for Block "204", in Line 2, delete "SURVACE" and insert --SURFACE--, therefor.

In the Specification

2. In Column 1, Line 39, delete "full hybrid systems (FHEVs)" and insert --full hybrid electric vehicles (FHEVs)--, therefor.

3. In Column 1, Line 42, delete "mild hybrid systems (MHEVs)" and insert --mild hybrid electric vehicles (MHEVs)--, therefor.

4. In Column 3, Line 56, delete "DRAWINGS" and insert --BRIEF DESCRIPTION OF THE DRAWINGS--, therefor.

5. In Column 5, Line 52, delete "0.5 mm) Further," and insert --0.5 mm). Further,--, therefor.

6. In Column 7, Line 24, delete "running More" and insert --running. More--, therefor.

7. In Column 8, Line 42, delete "that that the" and insert --that the--, therefor.

8. In Column 9, Line 30, delete "lasers beam 64" and insert --lasers beam 54--, therefor.

9. In Column 9, Line 31, delete "laser beam 64" and insert --laser beam 54--, therefor.

10. In Column 15, Lines 10-11, delete "or on combination," and insert --or in combination,--, therefor.

Signed and Sealed this
Fourteenth Day of May, 2019

Andrei Iancu
*Director of the United States Patent and Trademark Office*